(12) United States Patent
Sanger

(10) Patent No.: US 7,177,048 B2
(45) Date of Patent: Feb. 13, 2007

(54) N-CHANNEL SCREENING TOOL

(75) Inventor: Kurt M. Sanger, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 993 days.

(21) Appl. No.: 10/166,955

(22) Filed: Jun. 11, 2002

(65) Prior Publication Data

US 2003/0227500 A1 Dec. 11, 2003

(51) Int. Cl.
*H04N 1/52* (2006.01)
*H04N 1/58* (2006.01)
*B41J 2/47* (2006.01)

(52) U.S. Cl. .............. 358/1.9; 358/3.21; 358/3.26; 358/534; 358/504; 347/240

(58) Field of Classification Search ............. 358/1.9, 358/3.06, 3.21, 3.24, 3.26, 533–536, 504; 347/240, 251
See application file for complete search history.

(56) References Cited

U.S. PATENT DOCUMENTS

| | | | | |
|---|---|---|---|---|
| 4,965,599 A | * | 10/1990 | Roddy et al. | 347/240 |
| 5,164,742 A | | 11/1992 | Baek et al. | |
| 5,329,297 A | | 7/1994 | Sanger et al. | |
| 6,597,388 B2 | * | 7/2003 | Pierson | 347/240 |
| 6,623,894 B2 | * | 9/2003 | Pierson | 430/5 |
| 6,710,795 B2 | * | 3/2004 | Sanger | 347/240 |
| 6,888,558 B2 | * | 5/2005 | Pierson | 347/240 |

* cited by examiner

*Primary Examiner*—Scott A. Rogers
(74) *Attorney, Agent, or Firm*—Nelson Adrian Blish

(57) ABSTRACT

A number of lasers (402) used to image a bitmap file (630) of a halftone screen is comprised of generating a first bitmap file (630) for a first color. A first image (710) is printed with the first bitmap file for the first color with n lasers. A second image (720) is printed with the first bitmap file for the first color with n–1 lasers. An optimum number of lasers is selected for printing the first bitmap file based on the image with the least number of defects (700).

8 Claims, 7 Drawing Sheets

N-CHANNEL SCREENING TOOL

FIELD OF THE INVENTION

This invention relates to printers in general and in particular to selecting the number of channels used to print a halftone screen using a direct digital color proofer such as Kodak Approval.

BACKGROUND OF THE INVENTION

Pre-press color proofing is a procedure that is used by the printing industry for creating representative images of printed material without the high cost and time that is required to actually produce printing plates and set up a high-speed, high-volume printing press to produce an example of an intended image. These intended images may require several corrections and be reproduced several times to satisfy customers' requirements, which results in loss of profits. By utilizing pre-press color proofing, time and money can be saved. Ideally when using a proof to simulate the press-sheet the proof is screened at the same halftone screen rulings, screen angles, and dot shape. It is even better if the same raster image processor (RIP), is used to generate the screens and the writing resolution of the proofer and the plate writer are the same. These are the ideal conditions to guarantee that the proof is a reliable simulation of the press sheet.

A direct digital color proofer such as the one described in U.S. Pat. No. 5,164,742 images a bitmap of a halftone screen using a plurality of laser diodes at a high resolution. The Kodak Approval direct digital color halftone proofer introduced for sale in 1991 wrote at 1800 dots per inch and imaged halftone screens from 65 lines per inch to 300 lines per inch in each of cyan, magenta, yellow, and black. The original Kodak Approval Classic had eighteen writing lasers and two dummy channels. The Kodak Approval XP4, direct digital color halftone proofer, introduced in 1998 is available in either 2400 dots per inch or 2540 dots per inch writing resolution. The Kodak Approval XP series printers use up to 28 writing channels and two outside dummy channels. In 1999 Kodak introduced recipe color software that enabled the Approval family of proofers to image multiple donors using the same bitmap thereby mixing the colorant of the halftone screen in the proof. Today a screen set may include halftone bitmaps for cyan, magenta, yellow, black, orange, green, red, blue, white, metallic, and recipes. Each bitmap will have an associated screen ruling, screen angle, and RIP ID. The RIP ID is the make and model of the raster image processor that created the bitmap plane. The Kodak Approval system currently accepts RIP input from Harlequin Scriptworks, Heidelberg, Barco, Kodak Adobe RIP, Agfa, Dainippon Screen, Creo Scitex Prinergy, Scitex Brisque, Rampage, TIFF bitmap files, and others.

The halftone screen may beat against the number of writing channels in the proofer creating a low frequency banding that is objectionable in the output proof. For example with a Kodak Approval XP4, direct digital color halftone proofer, writing a 200 line screen halftone at 45 degrees with a 2540 dot per inch printer, each halftone dot is nine micro-dots wide. If all 28 writing channels are used then $\frac{1}{9}^{th}$ of a dot is left over every swath creating a beat frequency that is nine swaths wide. The swath period is 28 dots at 10 µm per dot for a total width of 280 µm. The beat frequency is (1 cycle)/(9×0.280 mm)=0.397 cycles per mm. If instead we image with 27 writing channels then each swath contains exactly three halftone dots and there is no beating against the writing width of the printer. The technique of setting the number of writing channels to eliminate the banding between the halftone screen and the printer is described in U.S. Pat. No. 5,329,297.

The problem with selecting the number of writing channels to eliminate beating between the printer and the halftone screen is to determine the optimum number of channels to use for each screen ruling and angle combination. Currently each halftone screen is imaged using each combination of numbers of channels, and the number of channels is selected that create the least amount of banding in the image. The process takes numerous proofs to complete. One proof is made for each selection of number of channels for each color plus an additional proof to study the final selection. The process requires a skilled operator to reconfigure the N-channel tables within the printer prior to imaging each proof. The process requires a skilled operator to evaluate the images and select the best number of channels.

The process of selecting the number of channels is repeated for each raster image processor (RIP), each dot shape, each screen ruling, each screen angle, and each color combination. If the RIP vendor modifies his screening algorithms then the optimization process needs to be checked to guarantee that the printer is setup at the optimum conditions. If a customer uses a RIP with a screen ruling and angle combination that has not been tested then the printer may not be optimized for the customer conditions.

In addition, the interaction between the writing channels and the halftone screen are dependent upon the magnitude of the errors within the group of writing channels. Higher quality printers with no errors produce less visible banding artifacts. These errors may include dot placement, printhead movement, channel power adjustment, and channel to channel crosstalk.

Thus, there exists a need to improve the process of selecting the number of channels used to image a given halftone screen ruling, screen angle, and RIP combination.

SUMMARY OF THE INVENTION

It is an object of the present invention to provide a process and method of selecting the number of lasers used to image a halftone bitmap with a unique screen ruling, screen angle, dot shape, and RIP.

It is an object of the present invention to provide a process for selecting the number of lasers used to image a halftone bitmap with a given screen ruling, screen angle, dot shape, and RIP that is not dependent upon the printer chosen. The invention adds error to the selection of channels used such that the beating between the number of channels and the halftone screen is amplified making it obvious which number of channels produces the least amount of beating.

It is an object of the present invention to provide a process for selecting the number of lasers used to image a halftone bitmap with a given screen ruling, screen angle, dot shape, and RIP that may be run by an unskilled operator. The invention adds error to the selection of channels used such that the customer may judge the resulting prints with little training. This enables the customer to tune his proofer for his own screening conditions.

Briefly, according to one aspect of the present invention a number of channels used to image a bitmap file of a halftone screen is comprised of generating a first bitmap file for a first color. A first image is printed with the first bitmap file for the first color with n lasers. A second image is printed with the first bitmap file for the first color with n−1 lasers.

An optimum number of lasers is selected for printing the first bitmap file based on the image with the least number of defects.

The invention utilizes in part, a process disclosed in copending U.S. patent application Ser. No. 09/832,746, filed Apr. 11, 2001, entitled "Tuning a Printer By Printing Patterns Which Beat Against a Spatial Frequency of a Component Within the Printer." In the present invention a sample image consisting of a vignette and solid patches is RIPed. The bitmap is limited to two inches wide so that multiple variations may be imaged along the drum direction of the printer. The bitmap is printed using the maximum number of channels, N. The bitmap is reprinted using N−1 channels. The bitmap is reprinted repeatedly using less channels each time. For each image the power to channel #1 is turned off so that there is always one channel turned off in each output image. This perturbs the printer creating a large error in the selection of writing channels, which amplifies the effect of the channels beating against the halftone screen, making it easier to detect the optimum number of lasers to use.

In one embodiment, a printer is programmed to allow the user to select a screened bitmap image, select a color donor, crop the screened bitmap to two inches wide, automatically turn channel #1 off, and image the bitmap using 28 through 20 writing channels with the selected donor color. The user then inputs the column of the best looking image, which is then used to set the correct number of lasers for the halftone screen ruling, screen angle, and RIP, into a table. The table is used by the printer on subsequent prints. By selecting the color in which the screened bitmap is printed, black may be selected to image the yellow bitmap plane, it becomes easier to judge the best number of channels. The visual contrast of black is greater than the visual contrast of yellow. Similarly black or another color may be substituted for cyan, magenta, green, etc.

The invention and its objects and advantages will become more apparent in the detailed description of the preferred embodiment presented below.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
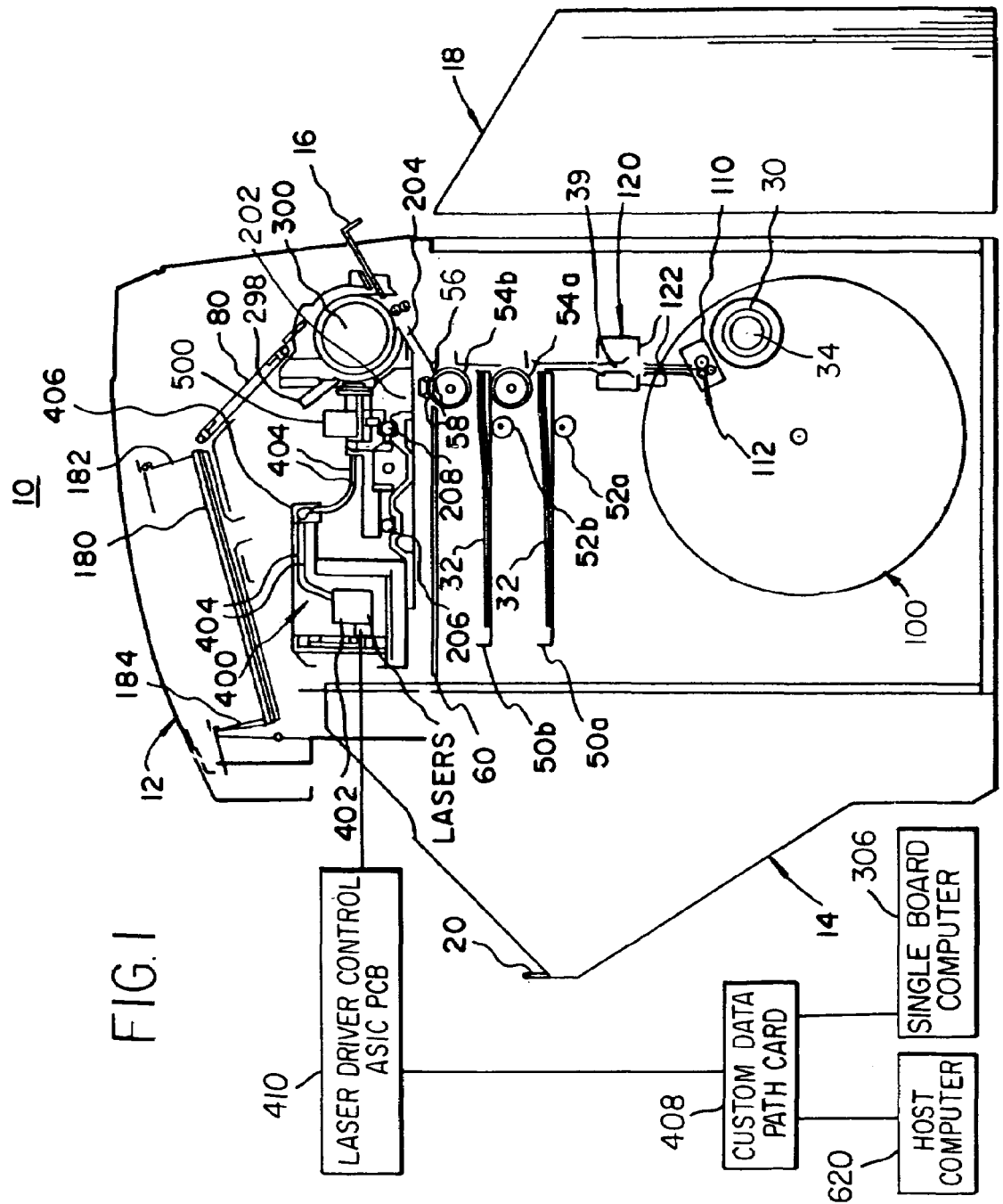
FIG. 1 is an elevational view in vertical cross section of an image forming apparatus of the present invention.

Referring to FIG. 1, there is illustrated an image forming apparatus 10 according to the present invention having an image processor housing 12, which provides a protective cover. A movable, hinged image processor door 14 is attached to the front portion of the image processor housing 12 permitting access to the two sheet material trays, lower sheet material tray 50a and upper sheet material tray 50b, that are positioned in the interior portion of the image processor housing 12 for supporting thermal print media 32 thereon. Only one of the sheet material trays will dispense the thermal print media 32 out of its sheet material tray to create an intended image thereon; the alternate sheet material tray either holds an alternative type of thermal print media 32 or functions as a back up sheet material tray. In this regard, the lower sheet material tray 50a includes a lower media lift cam 52a for lifting the lower sheet material tray 50a and ultimately the thermal print media 32, upwardly toward a rotatable, lower media roller 54a and toward a second rotatable, upper media roller 54b which, when both are rotated, permits the thermal print media 32 to be pulled upwardly towards a media guide 56. The upper sheet material tray 50b includes a upper media lift cam 52b for lifting the upper sheet material tray 50b and ultimately the thermal print media 32 towards the upper media roller 54b, which directs it towards the media guide 56.

The movable media guide 56 directs the thermal print media 32 under a pair of media guide rollers 58, which engages the thermal print media 32 for assisting the upper media roller 54b in directing it onto the media staging tray 60. The media guide 56 is attached and hinged to the lathe bed scanning frame 202 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for moving the thermal print medium receiver sheet material 32 resting on the media staging tray 60 under the pair of media guide rollers 58, upwardly through an entrance passageway 204 and around a rotatable vacuum imaging drum 300.

Continuing with FIG. 1, a roll of colorant donor material 34 is connected to the media carousel 100 in a lower portion of the image processor housing 12. Four rolls are used, but only one is shown for clarity. Each roll includes a colorant donor material 34 of a different color, typically black, yellow, magenta and cyan. These colorant donor materials 34 are ultimately cut into colorant donor materials and passed to the vacuum imaging drum 300 for forming the medium from which colorants imbedded therein are passed to the thermal print media 32 resting thereon, which process is described in detail herein below. In this regard, a media drive mechanism 110 is attached to each roll of colorant donor material 34, and includes three media drive rollers 112 through which the colorant donor material 34 of interest is metered upwardly into a media knife assembly 120. After the colorant donor material 34 reaches a predetermined position, the media drive rollers 112 cease driving the colorant donor material 34 and the two media knife blades 122 positioned at the bottom portion of the media knife assembly 120 cut the colorant donor material 34 into colorant donor sheet materials. The lower media roller 54a and the upper media roller 54b along with the media guide 56 then pass the colorant donor sheet material onto the media staging tray 60 and ultimately to the vacuum imaging drum 300 and in registration with the thermal print media 32 using the same process as described above for passing the thermal print media 32 onto the imaging drum 300. The colorant donor sheet material now rests atop the thermal print media 32 with a narrow gap between the two created by micro-beads imbedded in the surface of the thermal print media 32.

A laser assembly 400 includes several lasers 402. Laser diodes within the laser assembly are connected via fiber-optic cables 404 to a distribution block 406 and ultimately to the printhead 500. They can be individually modulated to supply energy to selected areas of the thermal print media in accordance with an information signal. The printhead 500 includes a plurality of optical fibers coupled to the laser diodes at one end and at and opposite end to a fiber-optic array within the printhead. The printhead is movable relative to the longitudinal axis of the imaging drum. The printhead 500 directs thermal energy received from the lasers, causing the colorant donor sheet material to pass the desired color across the gap to the thermal print media 32. The printhead 500 is attached to a lead screw 250 via the lead screw drive nut 254 and drive coupling for permitting movement axially along the longitudinal axis of the vacuum imaging drum 300 for transferring the data to create the intended image onto the thermal print media 32.

For writing, the vacuum imaging drum 300 rotates at a constant velocity, and the printhead 500 begins at one end of the thermal print media 32 and traverses the entire length of the thermal print media 32 for completing the transfer process for the particular colorant donor sheet material resting on the thermal print media 32. After the printhead 500 has completed the transfer process for the particular colorant donor sheet material resting on the thermal print media 32, the colorant donor sheet material is then removed from the imaging drum 300 and transferred out the image processor housing 12 via a skive or ejection chute 16. The colorant donor sheet material eventually comes to rest in a waste bin 18 for removal by the user. The above process is then repeated for the other three rolls of colorant donor materials 34.

After the color from all four sheets of the colorant donor materials has been transferred and the colorant donor materials have been removed from the vacuum imaging drum 300, the thermal print media 32 is removed from the vacuum imaging drum 300 and transported via a transport mechanism 80 to a color binding assembly 180. The entrance door 182 of the color binding assembly 180 is opened for permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the micro-beads thereon. After the color binding process has been completed, the media exit door 184 is opened and the thermal print media 32 with the intended image thereon passes out of the color binding assembly 180 and the image processor housing 12 and comes to rest against a media stop 20.

To mark or not mark the film the current to the lasers is turned on and off using a Kodak Laser Driver Control Asic Board, 410, Kodak Part Number 2J0809 and Kodak Part Number 2J0810. Bitmap image data is sent from the host computer 620 to a custom data path card 408, which synchronizes the data to the vacuum imaging drum 300. The datapath card may be Kodak writing engine controller (WEC), PCB Part Number 1J8270. This board accepts data through a SCSI connection. Data is downloaded to the board in sequential order. The board buffers the data line by line, and waits for a home signal from the drum encoder 304, shown FIG. 2, prior to sending the data to the laser driver board, 410. The drum encoder 304 in FIG. 2, outputs a frequency pulse train and a home signal 316. The custom data-path card also accepts the frequency pulse train 316 from the drum encoder 304 and multiplies the frequency to a higher rate to drive the pixel data at the correct time relative to the speed of the drum. The custom datapath card is programmed by the host computer 620 through an RS-232 interface to drive all or some of the laser channels in the machine. Multiple laser driver control ASIC boards may be used to support additional channels. Multiple custom data-path boards may be ganged together to drive additional channels.

Figure 2:
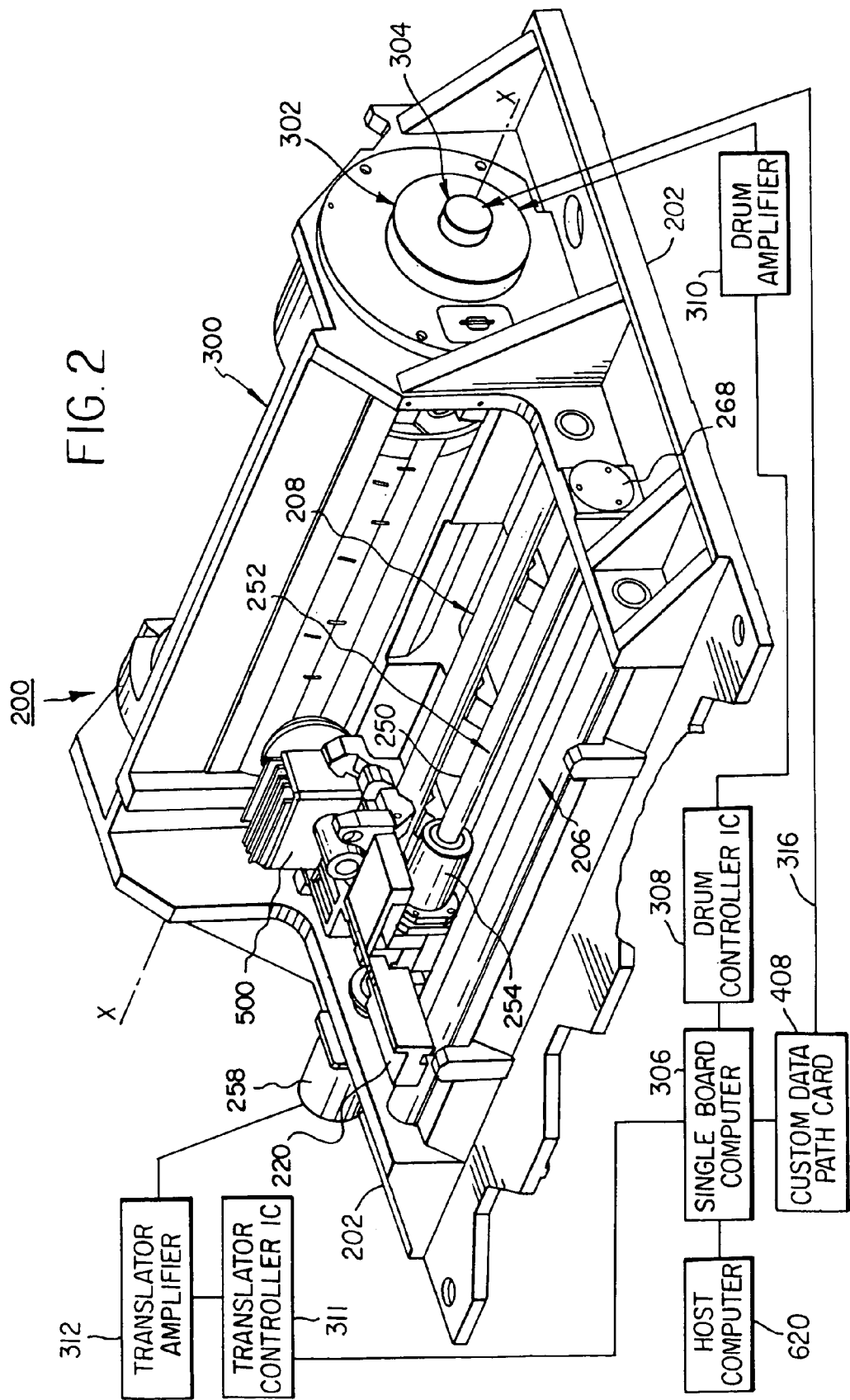
FIG. 2 shows a perspective view of a lathe bed scanning subsystem, or write engine, of the present invention.

Referring to FIG. 2, there is illustrated a perspective view of the lathe bed scanning subsystem 200 of the image forming apparatus 10, including the vacuum imaging drum 300, printhead 500 and lead screw 250 assembled in the lathe bed scanning frame 202. The imaging drum 300 is mounted for rotation about an axis X in the lathe bed scanning frame 202. In the preferred embodiment shown, the translation bearing rods 206, 208 are arranged parallel with axis X of the imaging drum 300, with the axis of the printhead 500 perpendicular to the axis X of the imaging drum 300. The printhead 500 is movable with respect to the imaging drum 300, and is arranged to direct a beam of light to the colorant donor sheet material. The beam of light from the printhead 500 for each laser 402 is modulated individually by modulated electronic signals from the image forming apparatus 10, which are representative of the shape and color of the original image, so that the color on the colorant donor sheet material is heated to cause volatilization only in those areas in which its presence is required on the thermal print media 32 to reconstruct the shape and color of the original image.

The printhead 500 is mounted on a movable translation stage member 220, which in turn, is supported for low friction slideable movement on translation bearing rods 206 and 208. The front translation bearing rod 208 locates the translation stage member 220 in the vertical and the horizontal directions with respect to axis X of the vacuum imaging drum 300. The rear translation bearing rod 206 locates the translation stage member 220 only with respect to rotation of the translation stage member 220 about the front translation bearing rod 208, so that there is no over-constraint condition of the translation stage member 220 which might cause it to bind, chatter, or otherwise impart undesirable vibration to the printhead 500 during the generation of an intended image.

Continuing with FIG. 2, the translation bearing rods 206, 208 are positioned and supported at their ends by rod support bores (not shown) in the outside walls of the lathe bed scanning frame 202. Each rod support bore supports an end of a translation bearing rod. The rod support bores are machined into the walls of the lathe bed scanning support frame 202 to allow adjustment of the translation bearing rods 206 and 208. The rod support bores may comprise notches in an appropriate direction at one or both ends of the translation bearing rod. The notches are adapted for allowing adjustment of the translation bearing rods to compensate for manufacturing defects in the translation bearing rod.

Referring to FIG. 2 a lead screw 250 is shown which includes an elongated, threaded shaft 252 which is attached to the linear drive motor 258 on its drive end and to the lathe bed scanning frame 202 by means of a radial bearing. The linear drive motor 258 is also called a translation motor. A lead screw drive nut 254 includes grooves in its hollowed-out center portion for mating with the threads of the threaded shaft 252 for permitting the lead screw drive nut 254 to move axially along the threaded shaft 252 as the threaded shaft 252 is rotated by the linear drive motor 258. The lead screw drive nut 254 is integrally attached to the to the printhead 500 through the lead screw coupling (not shown) and the translation stage member 220 at its periphery so that as the threaded shaft 252 is rotated by the linear drive motor 258 the lead screw drive nut 254 moves axially along the threaded shaft 252 which in turn moves the translation stage member 220 and ultimately the printhead 500 axially along the vacuum imaging drum 300.

For a printer writing with 28 writing channels there would be 28 lasers 402, coupled through 28 fiber optics 404 creating 28 writing spots imaged by printhead 500 onto the colorant donor material 34 which is loaded onto the vacuum imaging drum 300. The linear drive motor 258 is commanded to move the printhead 500 the distance of 28 lines per revolution of the vacuum imaging drum 300. Such a printer would have an error distribution which repeats at a spatial frequency of 28 lines caused by slight imperfections in the arrangement and intensity of writing spots projected by printhead 500.

For a lead screw 250 with a threaded shaft 252 which has a pitch of 16 mm per revolution there would be a spatial error at the rate of once per revolution of the leadscrew resulting in a prominent spatial frequency of $\frac{1}{16}$ cycles/mm. This leadscrew will also have error components at harmonics of each revolution resulting in errors at spatial frequencies of twice per revolution, and four times per revolution etc.

For a linear drive motor 258, such as a Vexta Model Number PH268M-E1.5B-C10, consisting of a two phase stepper motor with 100 poles per revolution there will 400 steps per revolution of the motor. Slight inaccuracies in each phase will result in spatial errors at the rate of 400 steps/rev×(1 rev/lead screw pitch). For a 16 mm lead screw, such as a Kirk VHD12000 Series Lead Screw, and a 100-pole two-phase stepper motor the spatial error frequency will be 25 cycles/mm. This linear drive system will also have harmonics at the rate of every other step, and every fourth step etc.

A motor, such as Hathaway Model Number BH03403, 302, drives the vacuum imaging drum 300, which will have poles causing a spatial error frequency in the drum direction. The bearings on the vacuum imaging drum 300, the bearings on the linear drive motor 258, the number of threads in the lead screw drive nut 254, will all contribute an amount of error which will result in spatial frequencies in the final image. One skilled in the art will recognize that there are numerous sources of error in such an image processing device. One will also recognize that many of these error sources will be repetitive and cause a repeating error, which results in a spatial frequency in the final image.

The host computer 620 programs a single board computer 306 with the number of channels and the drum speed. The single board computer controls the translator through an IM2000 High Performance Microstepping Controller IC, 311, made by Intelligent Motion Systems Inc., Taftville, Conn. The output of the controller IC is amplified 312 using a Model 513 DC Brushless Servo Drive from Copley Controls Corp, Wetwood, Mass.

The drum speed is controlled with a Hewlett Packard HCTL-1100 IC 308, whose output is amplified 310 using a Copley 800-313A amplifier. The encoder 304, such as a Dynamics Research Corp., DRC M21AAFODB26-2500, outputs home and frequency information to the custom data-path card 408, which buffers the signals and forwards them to the single board computer 306, and motion controller 308.

Once the host sends data to the custom data-path card 408 the custom data-path card tells the single board computer 306 that there is data ready to image. The single board computer then speeds up the vacuum imaging drum 300. Once the drum is at speed the translator starts up. Once the translator is at speed the single board computer informs the custom data-path card. The custom data-path card then waits for the next home index from the encoder 304, and starts sending one swath worth of data to the laser driver boards 410.

Figure 3:
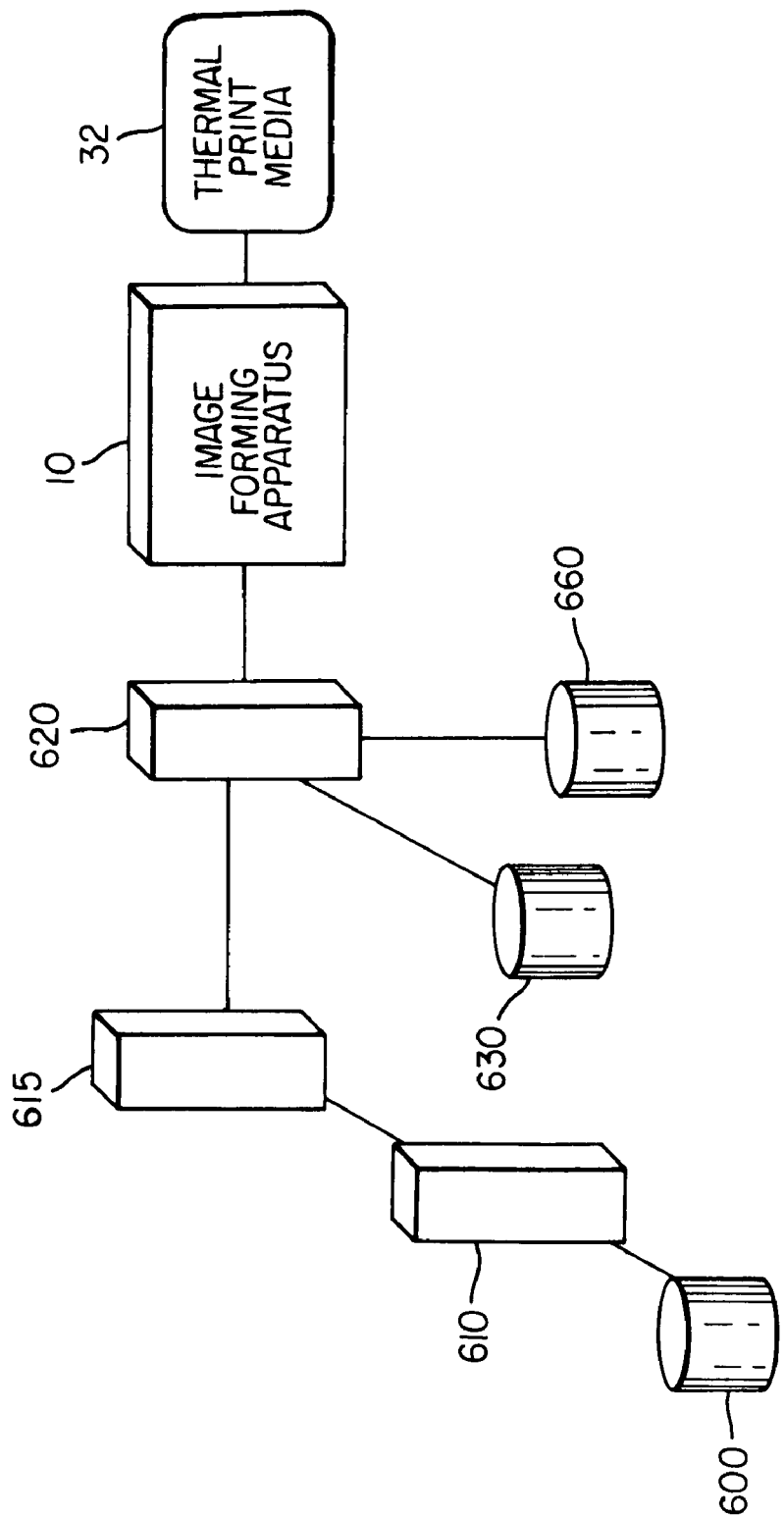
FIG. 3 is a system view showing the image forming apparatus with input raster image processor.

Referring to FIG. 3, there is shown a pre-press workstation 610, with customer artwork stored on disk 600. The customer may store images, text and line-work on disk 600. The customer may use a program such as Quark's QuarkXPress to combine the images, text, and line-work into a job consisting of one or more pages. The QuarkXPress Program running on the pre-press workstation 610 may output the job as a postscript or portable document format (PDF) file to the RIP for proofing 615. The RIP may consist of a software RIP running on a PC such as Harlequin "ScriptWorks" by Global Graphics Software LTD.

The RIP 615 will convert the job into separate cyan, magenta, yellow, and black halftone bitmaps at the writing resolution of the image forming apparatus 10. If the job contains red, green, blue, white, metallic, or recipe colors then the RIP will also create the appropriate halftone bitmap separations. The halftone bitmap images are sent directly from RIP 615 to host computer 620 where they may be temporarily stored on disk 630. The RIP also sends job information for each bitmap including color, density, screen ruling, and screen angle. The host computer uses an N-Channel table stored on disk 660 to determine the number of channels to use to image each halftone bitmap. The host computer then commands the image processor 10 to image each bitmap with the correct color, exposure, and number of channels to create the thermal print media 32. The RIP 615 may be collocated on the same computer as the host 620.

The host computer 620 programs the linear drive motor 258 to move a distance of N lines per revolution of the vacuum imaging drum 300. A single board computer 306 in the image processor speeds up the vacuum imaging drum 300 to the writing speed. The single board computer in the image processor then speeds up the translation stage member 220 to the translation speed. The host computer 620 then sends N lines of bitmap data to the image forming apparatus 10. The translation stage member 220 moves N lines during the vacuum imaging drum 300 revolution. This continues until the complete bitmap image is written. The custom data-path card 408 is used to synchronize the data between the host computer 620, vacuum imaging drum 300, and translation stage member 220. A drum encoder 304 mounted to the vacuum imaging drum 300 sends position information to the custom data-path card 408 and the single board computer 306. After the complete bitmap is printed the translation stage member 220 is returned to a home position, the colorant donor material 34 is exchanged for the next color, and the next bitmap 630 is written. The drum speed and laser power levels are adjusted to set the exposure for each bitmap and donor color.

Figure 4:
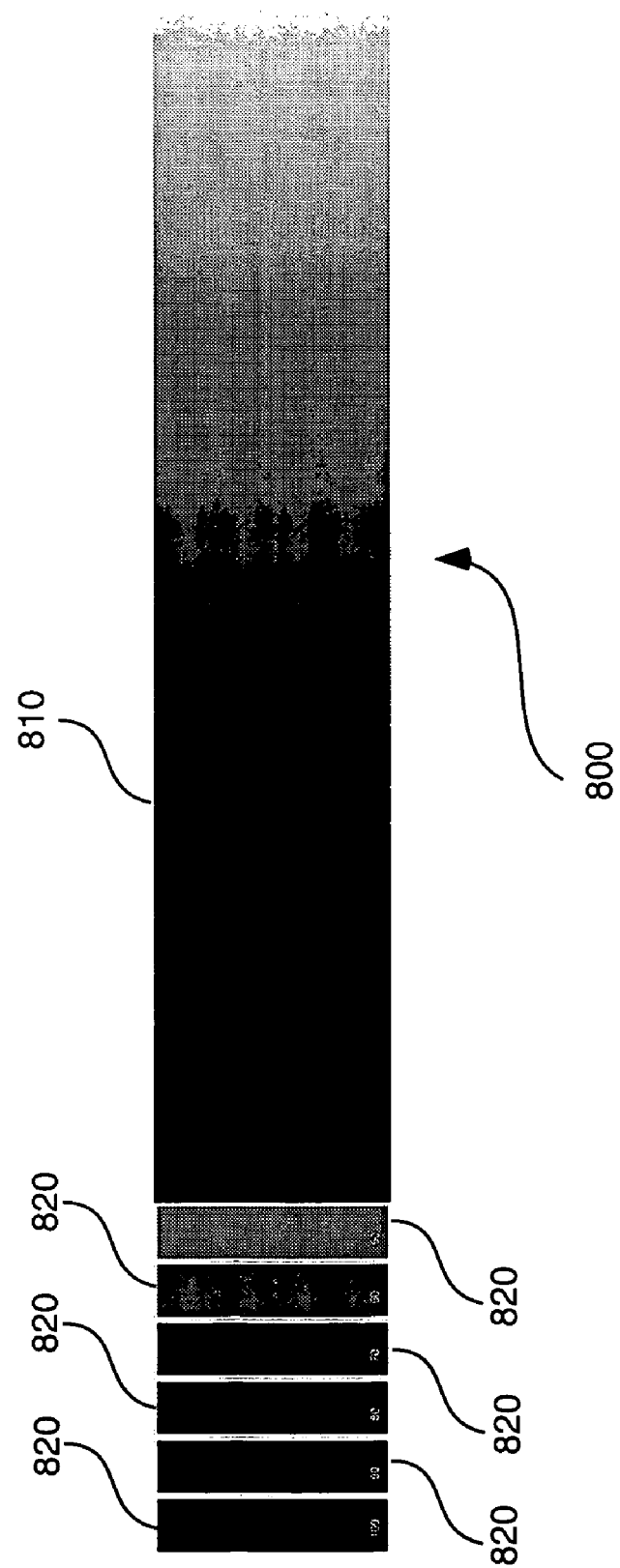
FIG. 4 is a test image which would be processed to a user's raster image processor (RIP).
Figure 5:
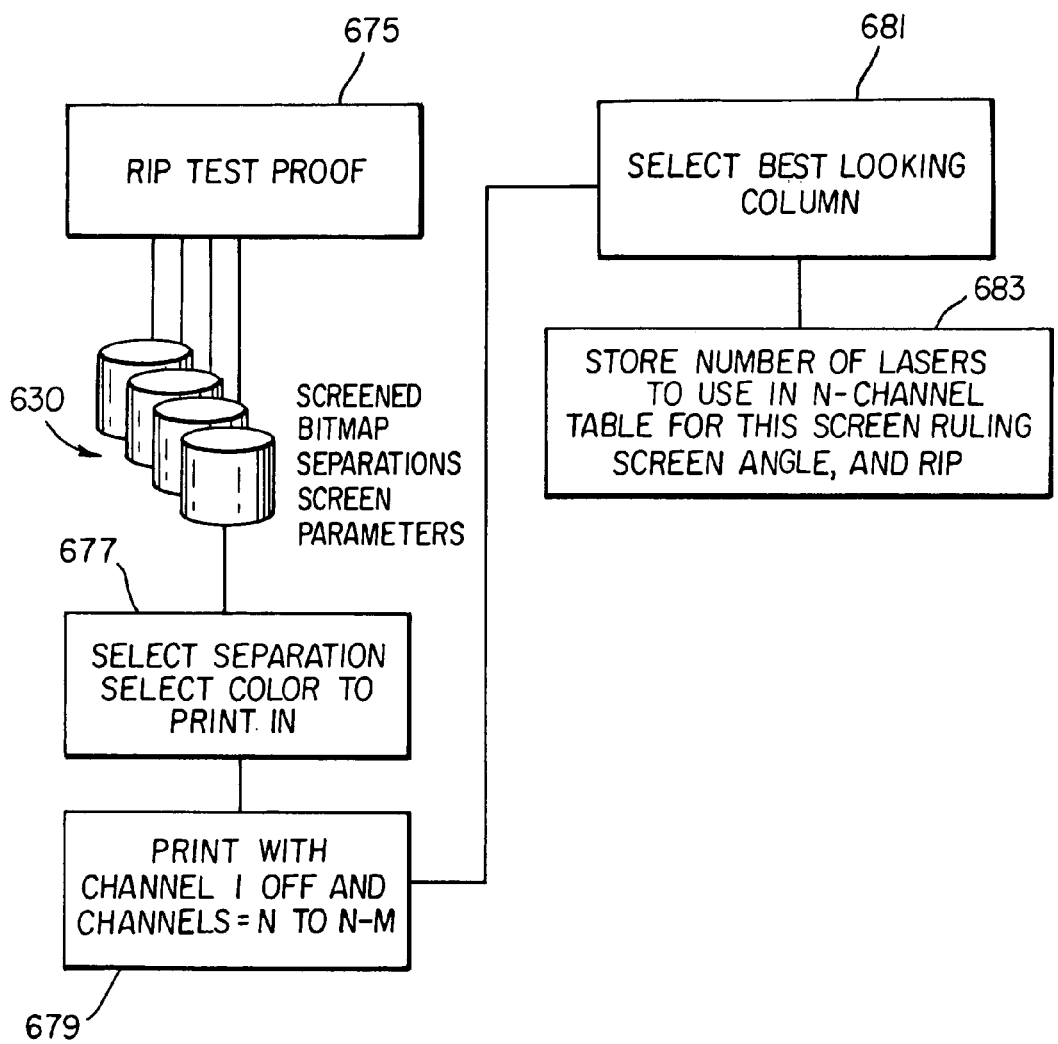
FIG. 5 is a block diagram of the process of imaging the customer screened halftone bitmap using our invention and selecting the number of channels.

FIG. 5 is a block diagram describing the process steps using this invention. FIGS. 1, 2, and 3 show the components used to perform the steps outlined in FIG. 5. FIG. 4 is a suitable test image, 800. This invention includes a test image 800 located on the host computer disk 630. The first step 675 is to RIP the test image 800 using RIP 615 to create the halftone bitmaps of the test image using the customer screen ruling, screen angle, and dot shape. One test image 800 is shown in FIG. 4 consisting of a four-color vignette 810 with four-color tints 820. The host computer 620 receives the bitmaps and stores them on disk 630.

In step two 677 the customer selects the color separation and donor color. The host computer 620 has an input screen to allow the customer to specify which separation to create the N-Channel test tool with. The customer selects one of the bitmap separations 630 created from the test image 800. The customer also selects which colorant donor material, FIG. 1 detail 34, to image the separation with.

Figure 6:
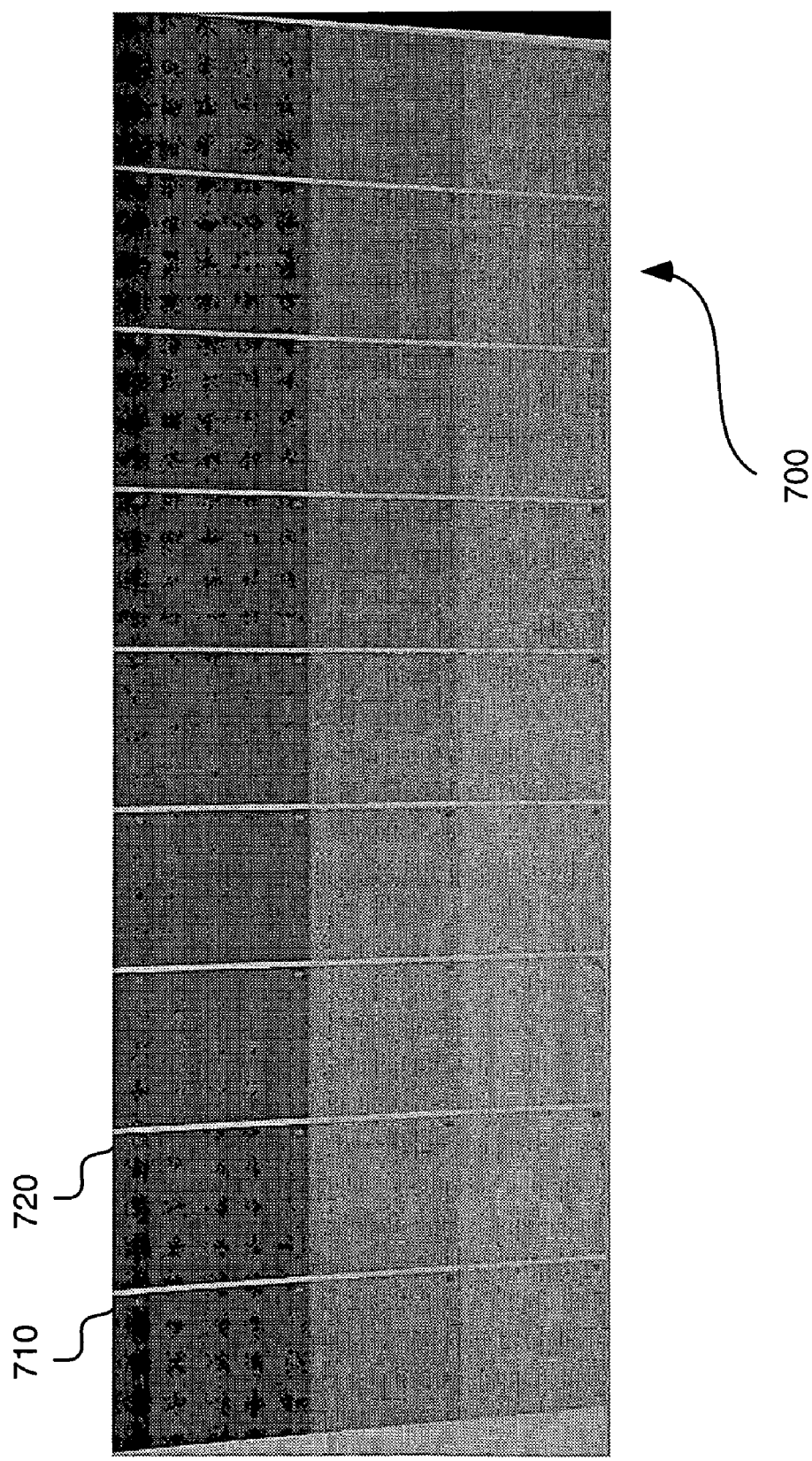
FIG. 6 is an image of the N-Channel tool test proof with a sample screened halftone bitmap.

In step three 679 the host computer 620 commands the image forming apparatus 10 to image the selected bitmap separation using N-channels with the selected color to create the image 700 shown in FIG. 6. The host computer also tells the image processor to image the same bitmap with N−1 channels 710 without removing donor and receiver in-between each imaging pass. The host computer also tells the image forming apparatus 10 to set the power level to the first channel to zero for each pass so that channel one does not image. For our implementation with 28 writing channels we repeat this process for 28, 27, through 20 writing channels resulting in the N-Channel test proof 700 shown in FIG. 6. The host computer automatically crops the bitmap so that multiple copies will fit within the width of the output proof.

One method of setting the power level to channel #1 to zero is to program the current in laser driver board 410 for channel #1 to zero. Another method is to disable the laser by shorting the laser cathode and anode using a relay on the laser driver board 410. A third method is to set all the bits for data lines being imaged by channel #1 to off. A fourth method is to manually disconnect the fiber optic from the laser for channel #1 and the printhead. A fifth method is to set the current below the level necessary for lasing. Other methods known in the art may be applied to effectively turn a channel off.

In addition to turning one or more channels off we may also perturb the machine by setting the current to one or more channels to a higher than normal level. This would output additional energy on lines imaged with these lasers.

Figure 7:
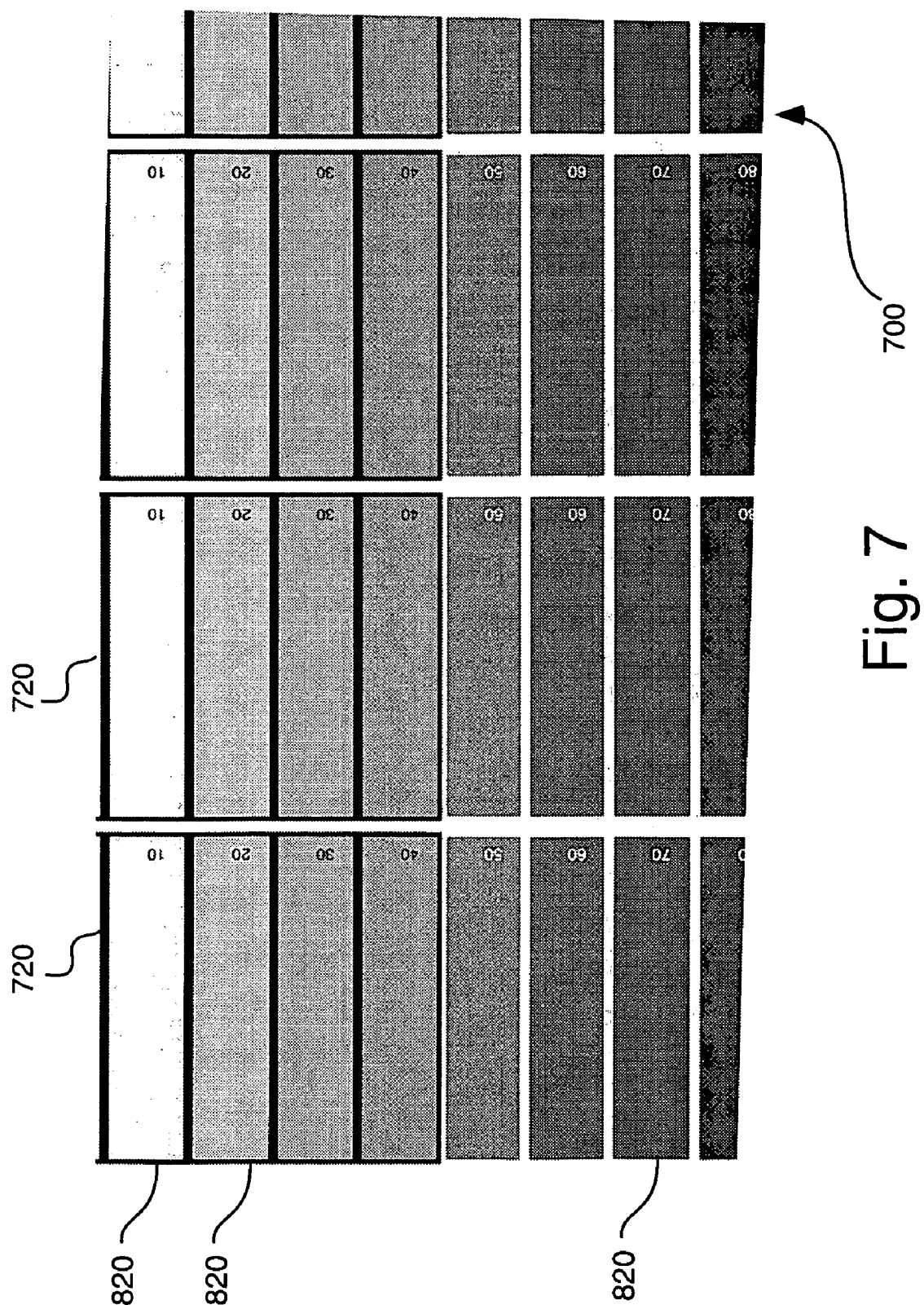
FIG. 7 is a high resolution scan of the test proof shown in FIG. 6.

FIG. 7 is a high resolution scan of features 710 and 720 of test proof 700. In this example 720 contains the least amount of banding indicating that column 720 was imaged with the optimum number of channels.

In step 4, 681 the customer selects the column from the output proof that has the least amount of artifacts. After making the N-Channel test proof 700 shown in FIG. 6 the host 620 asks the user to enter the column for the image with the least amount of banding.

In step 5, 683 The host records the number of lasers chosen for the screen ruling, screen angle, and RIP name passed from RIP 615 for the bitmap separation stored on disk 630 in the N-Channel table stored on disk 660. When user jobs with identical screen rulings, screen angles, and RIP make are encountered, the host computer 620 will lookup the number of channels previously selected from disk 660 and image the user bitmap 630 with the correct amount of power for channel 1. By setting channel 1 to the correct power level the errors in the group of channels will be significantly lower than at the time that the number of lasers was selecting producing an optimum proof of the user's job. This makes the lookup table information more robust, and increases the probability that the number of lasers chosen for these conditions will work across different image forming apparatus 10.

Repeat this process for each halftone screened bitmap desired. It is best to image the yellow bitmap plane with another color so that it is easier to judge the output proofs as the contrast in yellow is lower than the other colors.

The invention has been described in detail with particular reference to certain preferred embodiments thereof, but it will be understood that variations and modifications can be effected within the scope of the invention.

PARTS LIST

10. Image forming apparatus
12. Image processor housing
14. Image processor door
16. Ejection chute
18. Waste bin
20. Media stop
32. Thermal print media
34. Colorant donor material
50a. Lower sheet material tray
50b. Upper sheet material tray
52a. Lower media lift cam
52b. Upper media lift cam
54a. Lower media roller
54b. Upper media roller
56. Media guide
58. Media guide rollers
60. Media staging tray
80. Transport mechanism
100. Media carousel
110. Media drive mechanism
112. Media drive rollers
120. Media knife assembly
122. Media knife blades
180. Color binding assembly
182. Entrance door
184. Media exit door
200. Lathe bed scanning subsystem
202. Lathe bed scanning frame
204. Entrance passageway
206. Translation bearing rods
208. Translation bearing rods
220. Translation stage member
250. Lead screw
252. Threaded shaft
254. Lead screw drive nut
258. Linear drive motor
300. Vacuum imaging drum
302. Drum motor
304. Drum encoder
306. Single board computer
308. Drum controller IC
310. Drum amplifier
311. Translator controller IC
312. Translator amplifier
316. Drum encoder home and frequency pulses
400. Laser assembly
402. Laser
404. Fiber-optic cables
406. Distribution block
408. Custom data path card
410. Laser driver control ASIC PCB
500. Printhead
600. Customer artwork on disk
610. Pre-press workstation
615. Customer raster image processor
620. Host computer to control image processor
630. Screened halftone bitmaps on disk
660. N-Channel table stored on disk 675. Step 1. Ripping the test proof
677. Step 2. Selecting the color separation and donor color
679. Step 3. Printing M versions of test proof using N to N-M lasers with channel 1 turned off
681. Selecting the best column with the least amount of artifacts.
683. Step 5. Storing the number of lasers chosen for these screen ruling, screen angle, and raster image processor make
700. N-Channel test proof
710. Column 1 of N-Channel test proof created with N writing channels
720. Column 2 of N-Channel test proof created with N-1 writing channels
800. Test proof
810. Four-color vignette
820. Four-color tint

What is claimed is:

1. A method of selecting a number of channels used to image a bitmap file of a halftone screen comprising the steps of:
    generating a first bitmap file for a first color;
    printing a first image with said first bitmap file for said first color with n lasers;
    printing a second image with said first bitmap file for said first color with n-1 lasers; and
    selecting an optimum number of lasers for printing said first bitmap file based on the image with least number of defects.

2. A method as in claim 1 comprising the additional steps of:
    generating a second bitmap file for a second color;
    printing a third image with said second bitmap file for said second color with n lasers;
    printing a fourth image with said second bitmap file for said second color with n-1 lasers; and
    selecting an optimum number of lasers for printing said second bitmap file based on the image with least number of defects.

3. A method as in claim 2 comprising the additional steps of:
    generating a third bitmap file for a third color;
    printing a fifth image with said third bitmap file for said third color with n lasers;
    printing a sixth image with said third bitmap file for said third color with n-1 lasers; and
    selecting an optimum number of lasers for printing said third bitmap file based on the image with least number of defects.

4. A method as in claim 3 comprising the additional steps of:
    generating a fourth bitmap file for a fourth color;
    printing a seventh image with said fourth bitmap file for said fourth color with n lasers;
    printing a eighth image with said fourth bitmap file for said fourth color with n-1 lasers; and
    selecting an optimum number of lasers for printing said fourth bitmap file based on the image with least number of defects.

5. A method as in claim 1 comprising the additional step of imbalancing said lasers by decreasing power to at least one laser selected from a group comprised of said n-1 lasers prior to printing.

6. A method as in claim 1 comprising the additional step of imbalancing said lasers by increasing power to at least one laser selected from a group comprised of said n-1 lasers prior to printing.

7. A method as in claim 1 comprising the additional step of imbalancing said lasers by turning off power to at least one laser selected from a group comprised of said n-1 lasers prior to printing.

8. A method of selecting a number of channels used to image a bitmap file of a halftone screen comprising the steps of:
    generating a first bitmap file for a first color;
    printing a first image with said first bitmap file with a second color with n lasers;
    printing a second image with said first bitmap file with said second color with n-1 lasers; and
    selecting an optimum number of lasers for printing said first bitmap file based on the image with least number of defects.

* * * * *